Oct. 16, 1951    R. M. EVANS    2,571,697
METHOD FOR CORRECTING PHOTOGRAPHIC COLOR PRINTS
Filed June 20, 1946
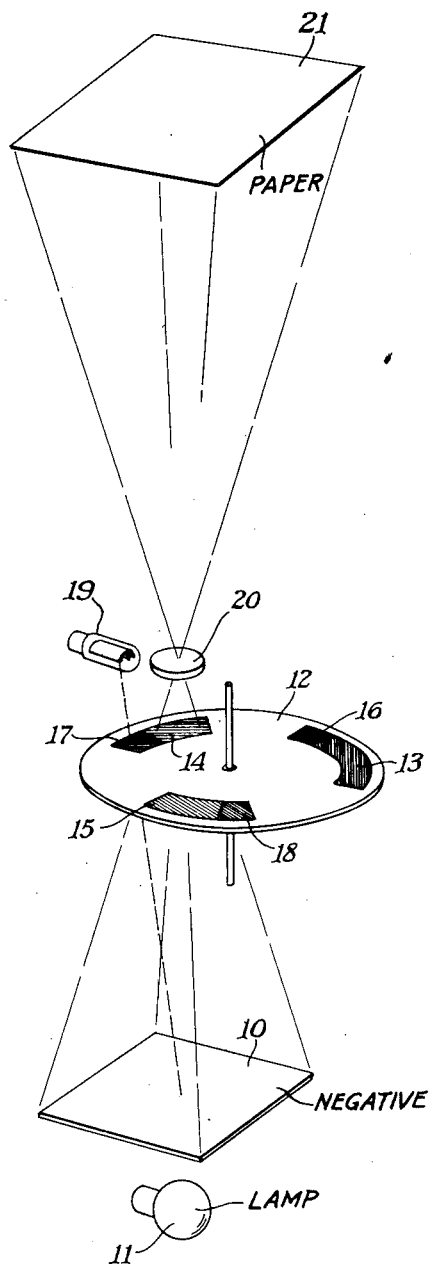
RALPH M. EVANS
INVENTOR
BY
ATTORNEYS

Patented Oct. 16, 1951

2,571,697

UNITED STATES PATENT OFFICE 2,571,697

METHOD FOR CORRECTING PHOTOGRAPHIC COLOR PRINTS

Ralph M. Evans, Rochester, N. Y., assignor to Eastman Kodak Company, Rochester, N. Y., a corporation of New Jersey Application June 20, 1946, Serial No. 677,973

2 Claims. (Cl. 95—2)

This invention relates to photography and particularly to a method for correcting photographic color images on printing.

When photographic color prints are made from negative or positive color images, the overall colors of the print frequently do not correspond to those of the subject photographed. This may arise from a number of causes such as change in sensitivity of the film on keeping, use of infrared light by the photographer, errors in processing and the like. If an exact print is made from such pictures based on the sensitivity which the taking film should have had, that is, under the assumption that the positive or negative transparency is correct, then the print, if a reflection print, will display the errors to a greater extent than the transparency because such prints are nearly always viewed under conditions in which there are comparison objects.

It is possible to make some correction for these errors during the printing, as by the use of various filter combinations, if the person who makes the print has seen the original subject and knows what the colors should be. However, where the print is made by a photographer or by operators who have not seen the original subject, such correction cannot be made because there is no way of knowing what the proper colors should be.

It is therefore an object of the present invention to provide a method for correcting photographic color images on printing. A further object is to provide a method for overcoming the defects in photographic images due to incorrect lighting conditions and emulsion sensitivity. A further object is to provide a method for correctly printing photographic color images without reference to the original subject. Other objects will appear from the following description of my invention.

These objects are in general accomplished by integrating or collecting the light passed through a photographic color image, measuring the integrated or collected light and controlling the printing light to overcome the inaccuracies in the colors of the transparency.

The accompanying drawing is a diagrammatic showing of the manner of correcting color images according to my invention.

It is frequently desirable to make natural color prints on an opaque support, that is, color prints which will be viewed by reflected light, or reflection prints, from negative or positive color transparencies. While my invention is not limited to making reflection prints, it is in making such prints that the benefits secured by my invention are most noticeable. If light is passed through the printing apparatus onto the printing material, without a color image or other obstruction in the light beam, the printing light should produce a neutral gray or substantially neutral gray image when the printing material is developed in the process for which it is intended. A light source which will reproduce substantially as gray on the printing material when the printing material is processed in a predetermined manner will, therefore, be assumed to be available.

If the light which will reproduce substantially as gray on the printing material is permitted to pass through the transparency which is to be printed so that a uniform amount of the light strikes the transparency at all points, the light passing through the transparency usually will not print as a neutral gray on the printing material but will deviate from gray by an appreciable amount. The light which passes through the transparency is collected or integrated according to my invention so that no subject matter of the transparency is visible but only the uniform color of the total transmitted light. The color of this light is measured by any suitable means, preferably by the use of a photo-electric cell or cells by which each of the primary colors, red, green and blue, is measured. By comparing these quantities of light with the quantities of red, green and blue light known to be contained in the original printing light beam, it is possible to calculate the quantity of light of each of the three primary colors which will be required to make the light transmitted through the transparency print substantially as gray on the printing material. When the printing light beam is so adjusted, the resulting print will be much closer to the original subject on the average than it is possible to obtain in any other way known at present.

While I have described integrating the printing light transmitted through the color transparency so that neutral gray would be produced on the printing material, it is not always desirable either theoretically or actually to integrate exactly to neutral gray. It may be desirable for various reasons to control the printing light so that an exact neutral gray would not be produced but a hue near gray. For example, if the original transparency has an overall yellow base color, it might be desirable to control the printing light so that it contains an excess of blue to neutralize the yellow color of the base.

My invention will now be described with reference to the acompanying drawing.

A photographic color transparency which I have represented as a negative 10 is illuminated with a lamp 11 in such a way that the negative receives uniform illumination throughout its entire area. This is common practice in photographic printers.

At a distance from the transparency 10 there is a means which I have represented as a rotatable disk for inserting a plurality of filters in the printing light beam. These filters may be attached to the disk 12 in such a manner that they can be successively inserted in the printing beam. There are three filters representing the primary colors and each of the filters is in two sections for a reason to be explained hereinafter. The sections 13, 14 and 15 of the filters are used for printing onto the print material and the sections 16, 17 and 18 are used for measuring the integrating light from the transparency 10. With the filters in the position shown in the drawing, for example, the integrating light from the transparency 10 passes through filters 17 to a photoelectric cell 19 which measures the intensity of light of the color of filter 17. In successive positions of the disk 12 the photoelectric cell 19 measures the color of light passing through the filter 16 and through the filter 18.

The printing light beam from the transparency 10 also passes through filters 13, 14 and 15 in succession and is focused by an optical system represented by a lens 20 onto the printing material 21. The quantity or intensity of the light passed through each of the primary color filters 13, 14 and 15 is controlled according to the measurements made by the photoelectric cell 19 so that the resulting light, if not focused by the lens systems of the printer on the printing material 21, would produce a substantially neutral gray image on the printing material 21.

A printer which may be used in the manner described above is disclosed in Tuttle and Brown, U. S. application, Serial No. 668,800 filed May 10, 1946, now U. S. Patent No. 2,566,264, August 28, 1951.

The filters 13, 14 and 15 used in the printing light beam according to my invention may be any suitable filters, such as those ordinarily used in making color separation prints and suitable for the print material used. For example, the blue filter may be a Wratten No. 47 filter, the green filter a Wratten No. 57A and the red filter a Wratten No. 25 filter. The filters 16, 17 and 18 which filter the light passing to the photocell 19 are likewise blue, green and red filters, although their absorption properties will generally be different from those of the projection filters because of the difference in characteristics of the photocell 19. The photocell 19 must obviously be somewhat sensitive to blue, green and red light and it is generally desirable to include in the filters 16, 17 and 18 an infra-red absorbing material because of the high infra-red sensitivity of most photo-electric cells. It has been found in practice that the filters used in the photocell beam need not have transmission peaks corresponding exactly to the absorption peaks of the dyes of the original transparency. This is because greater or less change can be made in the transmitted light, thereby varying the correction secured, by shifting the transmission peak of the filter relative to the absorption peak of the dye being measured. This does not, however, change the theory of operation of the printing system.

The lens filters or filters used in exposure of the printing material have transmission bands in the sensitivity regions of the printing paper. For example, the blue printing filters should not transmit green or red.

Where I refer to a printing material "whose sensitivity lies in three different regions of the spectrum," I mean a material sensitive to recognized regions such as the blue, green, red, ultra-violet, or infra-red regions. The material need not have a uniform or continuous sensitivity throughout any of the sensitivity regions, but may be sensitive to a narrow band within the region, as is well-known with photographic printing material. Since the dyes used in multi-color photographs frequently absorb radiation in regions outside the visible region, these regions outside the visible region may be used in printing, and it is sometimes desirable to do so.

Where I refer to "light which will print as gray," or "light which would produce substantially gray density" on the printing material, I mean that the light is so balanced that the printing material will produce a gray image or gray density when carried through the development process for which it is intended. It may not always be desirable to effect a correction to an exact neutral gray, but sometimes the correction need only be carried toward the neutral point, or in the direction of gray.

I claim:

1. The method of printing a multi-color transparency onto a photographic printing material whose sensitivity lies in three different regions of the spectrum, which comprises uniformly illuminating said transparency with light which contains energy in said three regions of the spectrum, integrating the light transmitted through the transparency, measuring the color of said integrated light, determining the color and amount by which said integrated light departs from light which will print as gray on said printing material, adjusting the intensity of the printing light so that when integrally passed through said transparency, it has the same printing characteristics as light which prints substantially as gray, and then focussing and printing said transparency onto said printing material with said last-mentioned light.

2. The method of printing a multi-color transparency onto a photographic printing material whose sensitivity lies in three different regions of the spectrum, which comprises uniformly illuminating said transparency with light which prints substantially as gray on the printing material, integrating the light transmitted through the transparency, measuring the color of said integrated light, determining the color and amount by which said integrated light departs from light which will print as gray, adjusting the intensity of the printing light so that when integrally passed through said transparency, it has the same printing characteristics as the light which prints as gray and then focussing and printing said transparency onto said printing material with said last-mentioned light.

RALPH M. EVANS.

REFERENCES CITED

The following references are of record in the file of this patent:

UNITED STATES PATENTS

| Number | Name | Date |
| --- | --- | --- |
| 2,117,727 | Jones | May 17, 1938 |
| 2,231,669 | Hall | Feb. 11, 1941 |
| 2,269,161 | Morse | Jan. 6, 1942 |
| 2,326,500 | Schneider et al. | Aug. 10, 1943 |
| 2,388,842 | Hanson | Nov. 13, 1945 |
| 2,402,660 | O'Grady | June 25, 1946 |

FOREIGN PATENTS

| Number | Country | Date |
| --- | --- | --- |
| 409,287 | Great Britain | Apr. 23, 1934 |
| 486,043 | Great Britain | May 30, 1938 |